United States Patent
Puente Pestaña et al.

(10) Patent No.: US 11,910,228 B2
(45) Date of Patent: Feb. 20, 2024

(54) METHOD OF MANAGING TRAFFIC BY A USER PLANE FUNCTION, UPF, CORRESPONDING UPF, SESSION MANAGEMENT FUNCTION AND NETWORK DATA ANALYTICS FUNCTION

(71) Applicant: Telefonaktiebolaget LM Ericsson (publ), Stockholm (SE)

(72) Inventors: Miguel Angel Puente Pestaña, Madrid (ES); Carlos Jimenez Cordon, Madrid (ES); Rodrigo Alvarez Dominguez, Madrid (ES); Marc Molla, Madrid (ES); Carlota Villasante, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 198 days.

(21) Appl. No.: 17/269,613

(22) PCT Filed: Nov. 9, 2018

(86) PCT No.: PCT/EP2018/080830
§ 371 (c)(1),
(2) Date: Feb. 19, 2021

(87) PCT Pub. No.: WO2020/057763
PCT Pub. Date: Mar. 26, 2020

(65) Prior Publication Data
US 2021/0345158 A1    Nov. 4, 2021

(30) Foreign Application Priority Data

Sep. 20, 2018   (EP) ..................................... 18382678

(51) Int. Cl.
*H04L 12/14*   (2006.01)
*H04L 41/046*  (2022.01)
(Continued)

(52) U.S. Cl.
CPC ..... *H04W 28/0268* (2013.01); *H04L 12/1407* (2013.01); *H04L 12/1432* (2013.01);
(Continued)

(58) Field of Classification Search
CPC . H04L 12/14–1496; H04L 41/02–5096; H04L 43/02–55; H04M 15/04–93;
(Continued)

(56) References Cited

U.S. PATENT DOCUMENTS 10,264,461 B2    4/2019  Aijaz
2018/0262924 A1  9/2018  Dao et al.

FOREIGN PATENT DOCUMENTS

| EP | 3585107 A1    | 12/2019 |
| JP | 2017200172 A  | 11/2017 |
| WO | 2018145654 A1 | 8/2018  |

OTHER PUBLICATIONS

Intel, "Overview of 5G System Requirements and Architecture", 3GPP TSG-SA4 Meeting #94, Sophia Antipolis, France, Jun. 26, 2017, pp. 1-17, S4-170521, 3GPP.
(Continued)

*Primary Examiner* — Timothy J Weidner
(74) *Attorney, Agent, or Firm* — COATS & BENNETT, PLLC

(57) ABSTRACT

A method of managing traffic associated with a User Equipment, UE, by a User Plane Function, UPF, in a telecommunication network, said UPF being associated with a Session Management Function, SMF, and a Network Data Analytics Function, NWDAF, wherein said UPF has access to an observation space comprising a list of possible states said network may take and wherein said UPF has access to an action space comprising a list of possible actions that said UPF is allowed to perform, said method comprising the steps of receiving a state of said network, wherein said state
(Continued)

is comprised by said list of possible states, receiving a reward, wherein said reward indicates a degree of satisfaction of said network to be in said state, receiving network traffic from said UE and performing, triggered by said received traffic, an action comprised by said list of possible actions based on said received state of said network and based on said received reward.

14 Claims, 6 Drawing Sheets

(51) Int. Cl.

| | | |
|---|---|---|
| H04L 41/052 | (2022.01) | |
| H04L 41/16 | (2022.01) | |
| H04L 43/062 | (2022.01) | |
| H04L 43/08 | (2022.01) | |
| H04L 43/16 | (2022.01) | |
| H04M 15/00 | (2006.01) | |
| H04W 4/24 | (2018.01) | |
| H04W 4/50 | (2018.01) | |
| H04W 8/18 | (2009.01) | |
| H04W 8/22 | (2009.01) | |
| H04W 24/02 | (2009.01) | |
| H04W 24/08 | (2009.01) | |
| H04W 24/10 | (2009.01) | |
| H04W 28/02 | (2009.01) | |
| H04W 28/08 | (2023.01) | |
| H04W 60/00 | (2009.01) | |
| H04W 60/04 | (2009.01) | |
| H04W 84/02 | (2009.01) | |
| H04W 88/16 | (2009.01) | |
| H04W 88/18 | (2009.01) | |
| H04W 92/02 | (2009.01) | |
| H04W 92/24 | (2009.01) | |

(52) U.S. Cl.
CPC .......... *H04L 41/046* (2013.01); *H04L 41/052* (2022.05); *H04L 41/16* (2013.01); *H04L 43/062* (2013.01); *H04L 43/08* (2013.01); *H04L 43/16* (2013.01); *H04M 15/58* (2013.01); *H04M 15/66* (2013.01); *H04W 4/24* (2013.01); *H04W 4/50* (2018.02); *H04W 8/18* (2013.01); *H04W 8/22* (2013.01); *H04W 24/02* (2013.01); *H04W 24/08* (2013.01); *H04W 24/10* (2013.01); *H04W 28/08* (2013.01); *H04W 60/00* (2013.01); *H04W 60/04* (2013.01); *H04M 2215/2026* (2013.01); *H04M 2215/7414* (2013.01); *H04M 2215/7428* (2013.01); *H04W 84/02* (2013.01); *H04W 88/16* (2013.01); *H04W 88/18* (2013.01); *H04W 92/02* (2013.01); *H04W 92/24* (2013.01)

(58) Field of Classification Search
CPC ... H04M 2215/01–96; H04W 4/24–70; H04W 8/005–30; H04W 16/02–32; H04W 24/02–10; H04W 28/02–26; H04W 36/0005–385; H04W 48/02–20; H04W 60/00–06; H04W 76/10–50; H04W 80/02–12; H04W 84/005–22; H04W 88/005–188; H04W 92/02–24

See application file for complete search history.

(56) References Cited

OTHER PUBLICATIONS

Ericsson, "Correction for Maximum Data Rate per UE for Integrity Protection for DRBs", 3GPP TSG-CT WG1 Meeting #111bis, Sophia-Antipolis, France, Jul. 9, 2018, pp. 1-27, C1-184049, 3GPP.

3rd Generation Partnership Project, "3rd Generation Partnership Project; Technical Specification Group Core Network and Terminals; Interface between the Control Plane and the User Plane Nodes; Stage 3 (Release 15)" Technical Specification, 3GPP TS 29.244 V15.2.0, Jun. 2018, pp. 1-176, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V15.2.0, Jun. 2018, pp. 1-217, 3GPP.

METHOD OF MANAGING TRAFFIC BY A USER PLANE FUNCTION, UPF, CORRESPONDING UPF, SESSION MANAGEMENT FUNCTION AND NETWORK DATA ANALYTICS FUNCTION

TECHNICAL FIELD

The present disclosure relates to the reporting of traffic metrics and, more specifically, to the reporting of traffic metrics by the UPF to the SPF.

BACKGROUND

Control and user plane separation, CUPS, enables a flexible placement of the separated control plane and user plane functions for supporting diverse deployment scenarios such as a central or a distributed User Plane Function, UPF.

In The Fifth Generation, 5G, telecommunication network, CUPS refers to Session Management Function, SMF, and UPF network functions and to the N4 reference point between them, which is based on Packet Forwarding Control Protocol, PFCP.

The SMF controls the packet processing in the UPF by establishing, modifying or deleting PFCP Session contexts and by adding, modifying or deleting Packet Detection Rules, PDRs, Forwarding Action Rules, FARs, Quality of service Enforcement Rules, QERs, Usage Reporting Rules, URRs, and/or Buffering Action Rule, BAR, per PFCP session context, whereby an PFCP session context may correspond to an individual PDU session or a standalone PFCP session not tied to any PDU session.

Each PDR contains a Packet Data Inspection, PDI, that are one or more match fields against which incoming packets are matched, and may be associated to the following rules providing the set of instructions to apply to packets matching the PDI:
  one FAR, which contains instructions related to the processing of the packets, specifically forward, duplicate, drop or buffer the packet with or without notifying the CP function about the arrival of a DL packet
  zero, one, or more QERs, which contains instructions related to the QoS enforcement of the traffic;
  zero, one, or more URRs, which contains instructions related to traffic measurement and reporting.

The Network Data Analytics Function, NWDAF, is a new Network Function being standardized by the Third Generation Partnership Project, 3GPP, in 5G. NWDAF represents operator managed network analytics logical function. NWDAF provides slice specific network data analytics to the Policy Control Function, PCF, and Network Slice Selection Function, NSSF. NWDAF provides network data analytics such as load level information to the PCF and NSSF on a network slice level and the NWDAF is not required to be aware of the current subscribers using the slice. NWDAF notifies or publishes slice specific network status analytic information to the PCF(s) and NSSF that are subscribed to it. PCF(s) and NSSF can collect directly slice specific network status analytic information from NWDAF. This information is not subscriber specific. PCF uses that data in its policy decisions. NSSF may use the load level information provided by NWDAF for slice selection.

In the current PFCP reporting solution, SMF configures PDRs associated to URRs in UPF. When a packet matches a PDR, the reporting actions configured in the associated URRs are executed. The current reporting solution in PFCP is used for charging, so the metric defined in URR is traffic volume. It is reported along with the reporting time or event (for time and event-based charging).

As mentioned, the 5G Core network, 5GC, introduces a new function for analytics, NWDAF, that collects data from the NFs. So far, the standard specifies that NWDAF provides load analytics, so for the moment there is a requirement for UPF to provide load metrics. But standardization has just started and NWDAF will incorporate further analytics in the future. It is foreseen, by the inventors, that NWDAF will provide analytics as well taking user plane traffic metrics such as service flow metadata, network metrics, service QoE indicators, as input. As UPF is an important source of such user plane metrics, UPF shall be able to send these traffic metrics to SMF, and then SMF relies them to NWDAF. Such traffic measurements may also be consumed by other network functions such as PCF to enforce certain policies in real time.

In the current 5G architecture, the UPF receives actions to carry out from SMF through the N4 interface, which is based on the 3GPP CUPS standard. These actions are executed on a per user session basis and triggered when a packet matches a certain traffic filter, i.e. PDR. When a packet matches a PDR, the actions associated to that PDR are executed.

The actions are encapsulated in the so called PFCP rules, e.g. FAR to indicate how to forward packets, e.g. traffic breakout towards an edge network, or load balancing in a multi-access scenario, or QER to indicate what QoS to apply to the traffic, e.g. apply throttling, prioritize traffic, etc.

In turn, the SMF may derive the actions to send to UPF based on the policy rules received by PCF or based on static configuration. UPF may also have static configuration.

Drawbacks of this solution are the following:
  It's not flexible when it comes to the degree of freedom for the UPF to decide on what actions to take. All the decisions are taken in the control plane. UPF shall stick to what SMF commands.
  In turn, SMF takes input from PCF regarding what traffic management policies to apply. But these policies are defined by the operator in an offline way, therefore they may not be optimal to adapt to changing traffic conditions.
  There is no room for flexible optimization mechanisms in UPF. If any optimization is to be carried out SMF needs to be notified first, and then SMF shall update the rules/actions in UPF.
  Reactiveness to network changing conditions is slow. When the network conditions change and the UPF configuration needs to be readjusted, the closed loop spans from the UPF/probes to the control plane Network Functions like the SMF, PCF, NWDAF, and back again to the UPF to execute updated actions. This entails non-negligible delay since the network issue happens until the mitigation action is applied.
  All the decision logic is placed in SMF. UPF just executes the actions that SMF commands. This may be a problem when a large number of UPFs are deployed in the network since the decision-making processes may increase a great deal the SMF's CPU and memory load.

SUMMARY

An object of the present disclosure is to provide for methods which overcomes the drawbacks as stated above.

It is another object of the present disclosure to provide for a User Plane Function, UPF, a Session Management Function, SMF, and a Network Data Analytics Function, NWDAF, that overcome the drawbacks as mentioned above.

In a first aspect of the present disclosure, there is provided a method of managing traffic associated with a User Equipment, UE, by a User Plane Function, UPF, in a telecommunication network, said UPF being associated with a Session Management Function, SMF, and a Network Data Analytics Function, NWDAF, wherein said UPF has access to an observation space comprising a list of possible states said network may take and wherein said UPF has access to an action space comprising a list of possible actions that said UPF is allowed to perform.

The method comprising the steps of:
receiving, by said UPF, from said NWDAF, a state of said network, wherein said state is comprised by said list of possible states;
receiving, by said UPF, from said NWDAF, a reward, wherein said reward indicates a degree of satisfaction of said network to be in said state;
receiving, by said UPF, network traffic from said UE;
performing, by said UPF, triggered by said received traffic, an action comprised by said list of possible actions based on said received state of said network and based on said received reward.

One of the advantageous of the present disclosure is that the UPF is made more flexible in that it has more freedom to decide on what actions to take. More specifically, the UPF may be arranged in such a way that it intends to take actions that would increase the reward, which actions may be taken based on previous results as well as on the current state of the network.

In accordance with the present disclosure, the action is based on the received state of the network an based on the received award. The UPF may keep track of the actions that it has performed for a variety of possible states of the network, and may use that particular information as well during the decision process in determining which action to perform.

In an example, the method further comprises the steps of:
transmitting, by said UPF, to said NWDAF, a UPF Agent Register Request message to register said UPF in said NWDAF;
receiving, by said UPF, from said NWDAF, a UPF Agent Register Response message acknowledging said registration, wherein said Response message further comprises said observation space.

The UPF Agent Register Request message may comprise the UPF identification and an optional indication of the UPF location or subnetwork, i.e. network slice instance, since the NWDAF may use this information to distinguish UPFs on a per location or on a per subnetwork basis.

The received UPF Agent Register Response message may comprise the network observation space that the NWDAF uses a basis to provide the network states. This information lets the UPF know the set of possible states the network can take. It may further comprise the reporting configuration for the UPF to report the network conditions to NWDAF. This may provided as a list whose rows include:
i. A metric-ID, indicating what parameter or metric shall be reported (e.g. delay, packet loss, etc.)
ii. A reporting trigger, indicating whether the reporting shall be periodic or threshold-based, also including the period value or threshold value.
iii. An indication of the desired accuracy for each metric. This information helps UPF to adjust the probing and reporting mechanisms In a further example, the method further comprises the steps of:
receiving, by said UPF, from said SMF, a Session Establishment Request message, wherein said Session Establishment Request message comprises said list of possible actions being at least one of:
one or more Forwarding Action Rules, FAR's, for indicating forwarding related actions for traffic received from said UE;
one or more Quality of Service Enforcement Rules, QER's, for indicating quality related actions for traffic received from said UE;
transmitting, by said UPF, to said SMF, a Session Establishment Response message for acknowledging said Session Establishment Request message.

The list of possible action may comprise one or more FAR's as well as one or more QER's. These rules may thus constitute the action as defined in the present disclosure.

In yet another example, the method further comprises the steps of:
transmitting, by said UPF, to said NWDAF a Network State Report message for requesting said state of said network as well as for a corresponding reward;
receiving, by said UPF, from said NWDAF, said state of said network as well as said corresponding reward.

It is noted that the state of the network may be provided to the UPF pro-actively by the NWDAF, or the UPF may actually request the state of the network from the NWDAF. The latter has the advantage that the UPF is provided with the latest state of the network, such that the decision on which action to perform is not taken on relatively old data.

In a further example, the step of performing said action comprises:
determining, by said UPF, which action to perform using a reinforcement learning algorithm taking into account previously performed actions by said UPF associated with previously observed states of said network as well as corresponding rewards.

Reinforcement learning is considered an area of machine learning concerned with how agents, like the UPF, ought to take actions in an environment so as to maximize some notion of cumulative reward, i.e. the reward as defined in the present disclosure.

In machine learning, the environment is typically formulated as a Markov Decision Process, as many reinforcement learning algorithms for this context utilize dynamic programming techniques. The main difference between the classical dynamic programming methods and reinforcement learning algorithms is that the latter do not assume knowledge of an exact mathematical model of the MDP and they target large MDPs where exact methods become infeasible.

Following the above, it was one of the insights of the inventors to use a reinforcement learning algorithm for determining which action to perform by the UPF, which reinforcement learning algorithm may use the state of the network, the reward and any of the previously performed actions into account, i.e. as input.

In a second aspect, there is provided a method of supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an observation space comprising a list of possible states said network may take The method comprising the steps of:
receiving, by said NWDAF, from said UPF, a UPF Agent Register Request message to register said UPF in said NWDAF;

transmitting, by said NWDAF, to said UPF, a UPF Agent Register Response message acknowledging said registration, wherein said Response message further comprises said observation space.

The advantages of the first aspect of the disclosure are also inherently part of the other aspects of the present disclosure. Furthermore, it is pointed out that although the claims read as if all the modules/equipment according to an aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipment as such In an example, the method further comprises the step of:
determining, by said NWDAF, a state of said network, wherein said state of said network is comprised by said list of possible states;
determining, by said NWDAF, a reward, wherein said reward indicates a degree of satisfaction of said network to be in said state;
transmitting, by said NWDAF, to said UPF, said determined state of said network and said reward.

In a further example, the step of determining said reward further comprises determining said reward based on any of an overall network load status or a Quality of Experience of said UE.

In a third aspect of the present disclosure, there is provided a method of supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an action space comprising a list of possible actions said UPF is allowed to perform The method comprises the steps of:
receiving, by said SMF, a Session Establishment Request message for requesting, by said UE, a session in said telecommunication network;
determining, by said SMF, said action space associated with said UE;
transmitting, by said SMF, said determined action space to said UPF.

In an example, the method further comprises the step of retrieving, by said SMF, policy rules associated with said UE from a Policy Control Function, PCF, and wherein said step of determining said action space comprises determining said action space based on said retrieved policy rules.

In an example, the step of determining said action space comprises:
determining one or more Forwarding Action Rules, FAR's, for indicating forwarding related actions for traffic received from said UE, and
determining one or more Quality of Service Enforcement Rules, QER's, for indicating quality related actions for traffic received from said UE.

In a fourth aspect of the present disclosure, there is provided a User Plane Function arranged for managing traffic associated with a User Equipment, UE, in a telecommunication network, said UPF being associated with a Session Management Function, SMF, and a Network Data Analytics Function, NWDAF, wherein said UPF has access to an observation space comprising a list of possible states said network may take and wherein said UPF has access to an action space comprising a list of possible actions that said UPF is allowed to perform, UPF comprising:
receive equipment arranged for receiving, from said NWDAF, a state of said network, wherein said state is comprised by said list of possible states, and for receiving, from said NWDAF, a reward, wherein said reward indicates a degree of satisfaction of said network to be in said state, and for receiving network traffic from said UE;
process equipment arranged for performing, triggered by said received traffic, an action comprised by said list of possible actions based on said received state of said network and based on said received reward.

In a fifth aspect of the present disclosure, there is provided a Network Data Analytics Function, NWDAF, arranged for supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an observation space comprising a list of possible states said network may take, said NWDAF comprising:
receive equipment arranged for receiving, from said UPF, a UPF Agent Register Request message to register said UPF in said NWDAF;
transmit equipment arranged for transmitting, to said UPF, a UPF Agent Register Response message acknowledging said registration, wherein said Response message further comprises said observation space.

In a sixth aspect of the present disclosure, there is provided a Session Management Function, SMF, arranged for supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an action space comprising a list of possible actions said UPF is allowed to perform, wherein said SMF comprises:
receive equipment arranged for receiving a Session Establishment Request message for requesting, by said UE, a session in said telecommunication network;
process equipment arranged for determining said action space associated with said UE;
transmit equipment arranged for transmitting said determined action space to said UPF.

In a seventh aspect of the present disclosure, there is provided a computer program product comprising a computer readable medium having instructions stored thereon which, when loaded on a Network Function, NF, cause said NF to perform a method in accordance with any of the method claims as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
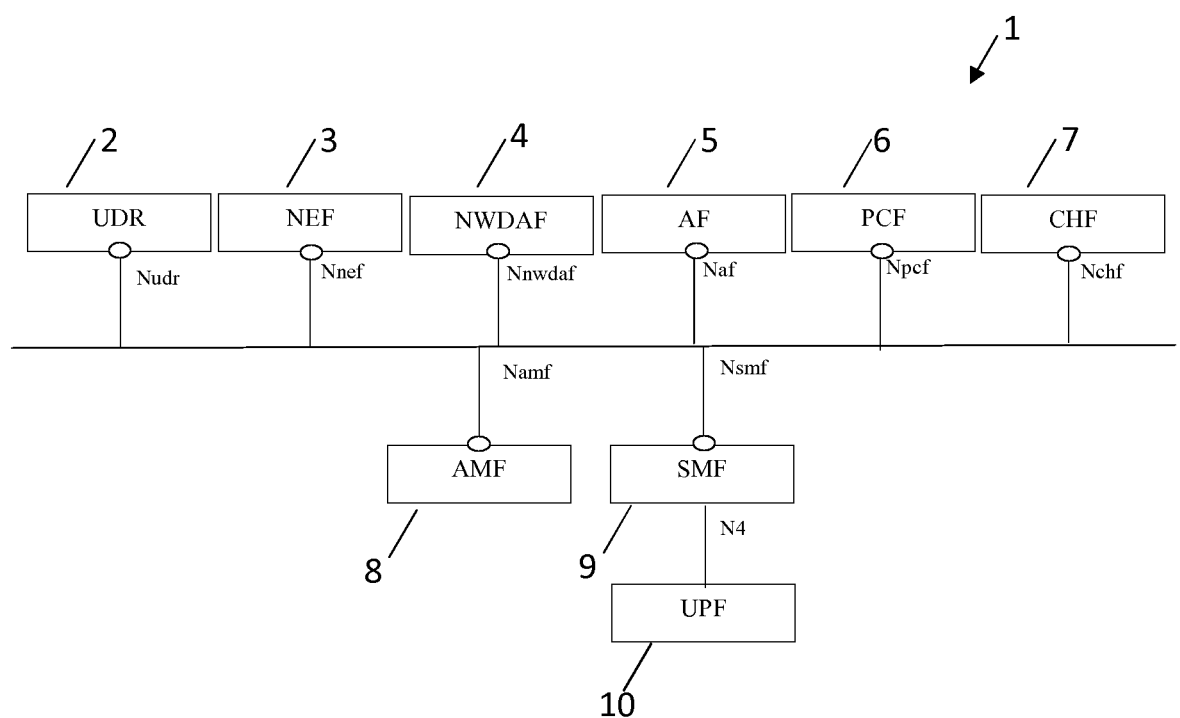
FIG. 1 schematically illustrates a reference architecture of a Fifth Generation, 5G, telecommunication network.

FIG. 1 schematically illustrates part of the reference architecture 1 of a fifth generation, 5G, Service Based Architecture, SBA, telecommunication network, according to the prior art. The 5G system architecture comprise the following Network Functions, NFs:

Access and Mobility Management Function, AMF, 8
Network Exposure Function, NEF, 3
Policy Control Function, PCF, 6
Session Management Function, SMF, 9
Unified Data Management, UDM, 2
User Plane Function, UPF, 10
Application Function, AF, 5
Network Data Analytics Function, NWDAF, 4
Online Charging System, OCS, 7.

A functional description of these network functions is specified in clause 6 of the Third Generation Partnership Project, 3GPP, standard 23.501, "System Architecture for the 5G system", the contents of which are included herein, by reference.

Figure 2:
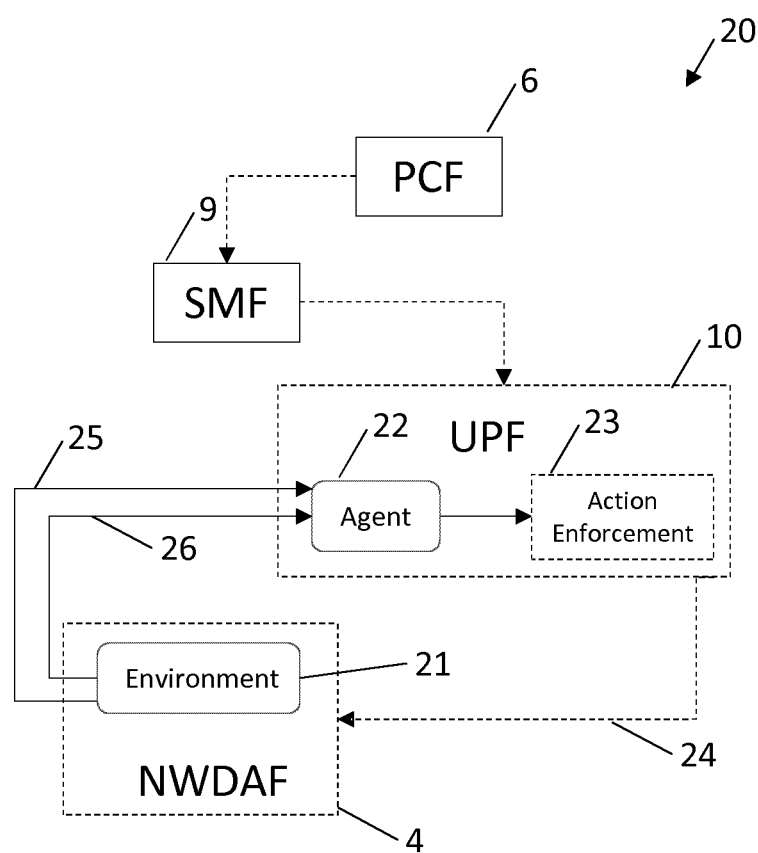
FIG. 2 schematically illustrates an exemplary architecture of the solution proposed according to the present disclosure.

FIG. 2 schematically illustrates an exemplary architecture 20 of the solution proposed according to the present disclosure.

Here, the network nodes PCF 6, SMF 9, UPF 10 and NWDAF 4 are shown, and how these nodes collaborate with each other.

As mentioned above, one of the aspects of the present disclosure is related to a reinforcement learning procedure. Reinforcement learning is a type of machine learning where an agent 22, comprised by the UPF 10, learns how to behave in an environment by performing actions and seeing the results. When performing 23 an action, the agent 22 received a reward 26, which indicates whether the environment 21 is in a desirable state or not. The agent 22 may execute algorithms that learn to take actions that improves, i.e. maximizes, some notion of cumulative reward in the long term.

In machine learning, the environment is typically modeled as a Markov decision process, MDP. MPD uses a finite set of states and finite set of actions that lead to state changes. A reinforcement learning agent interacts with its environment in discrete time steps. As depicted in FIG. 2, at each time, the environment 21 is in a particular state 25, and sends an observation of this state 25 along with the current reward 26 to the agent 22. The agent may then choose any action that is available in that state. The environment 21 may then respond at the next time step by moving into a new state and giving the agent 22 a corresponding reward.

All possible actions that the agent 22 can take is called the action space, and all possible states of the environment is called the observation space.

Iterating over this process and observing the rewards, the agent 22 may learn improved policies that map states to actions in such a way that the cumulative reward of the actions gets improved.

The agent 22 may switch between two modes and may find a balance between them: exploration, i.e. of uncharted territory, and exploitation, i.e. of current knowledge:

Exploration—The agent 22 may take actions that does not follow the optimal policies. E.g. selecting actions randomly, using heuristic algorithms, or using more complex and optimized methods.

Exploitation—The agent 22 may take actions according to the optimal policies that have been learned during the exploration phase.

The agent may have full observability of the whole environmental state or have partial observability of the environment state. This means that different agents acting over the same environment may receive different state information from it.

Figure 3:
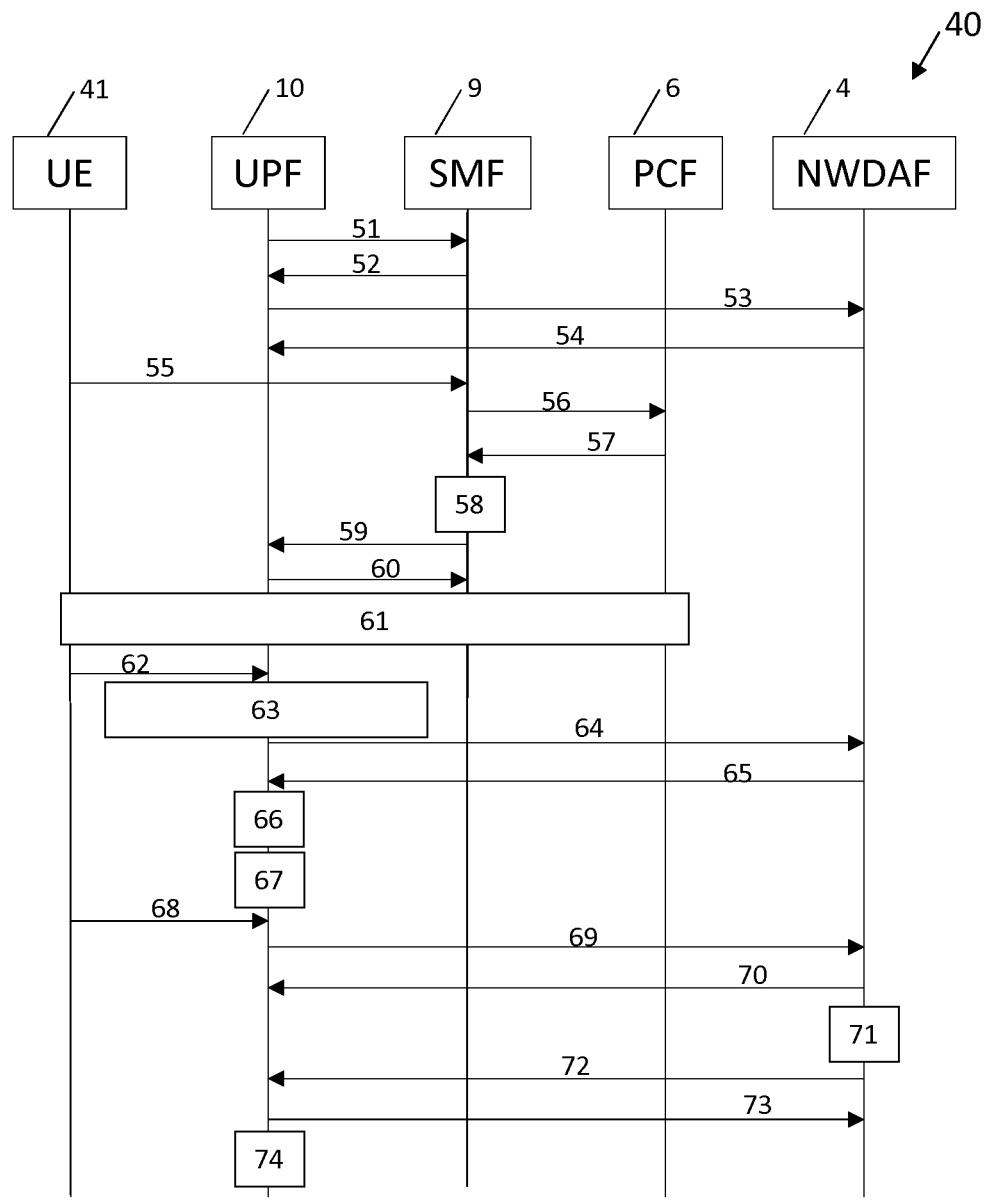
FIG. 3 schematically illustrates detailed steps of method according to the present disclosure.

FIG. 3 schematically illustrates detailed steps of a method 40 according to the present disclosure. It is noted that these detailed steps belong to an example of the method and may not be considered limiting for the claims as enclosed.

The method involves the User Equipment 41, the UPF 10, the SMF 9, the PCF 6 and the NWDAF 4.

The detailed steps of this example in accordance with the present disclosure are the following:

51. When the UPF 10 is deployed in the network, it first needs to associate to an SMF 9. To that extent the UPF 10 sends to SMF a PFCP Association Setup Request message including the UP function features it supports. It also includes the indication of a new feature: the support of the Reinforcement Learning agent in the UPF 10.

52. In turn the SMF 9 replies to the association request with a PFCP Association Setup Response message including the CP function features it supports. It also includes the indication of a new feature: the support of the logic to handle the UPF Reinforcement Learning agent. It may be noted that Step 51 may be triggered by the UPF 10 or the SMF 9. In case it is triggered by SMF 9 the association request includes the CP features and the response the UP features.

53. The UPF 10 sends a UPF Agent Register Request message to NWDAF 4 to register the UPF agent. The message includes the UPF-ID and an optional indication of the UPF location or subnetwork (e.g. network slice instance), since NWDAF may use this information to distinguish UPFs on a per location/subnetwork basis.

54. NWDAF 4 sends to UPF 10 a UPF Agent Register Response message acknowledging the agent registration. The message includes:

The network observation space that the NWDAF 4 uses a basis to provide the network states. This information lets the UPF know the set of possible states the network can take.

The reporting configuration for the UPF 10 to report the network conditions to NWDAF. This is provided as a list whose rows include:
  i. A metric-ID, indicating what parameter or metric shall be reported (e.g. delay, packet loss, etc.)

ii. A reporting trigger, indicating whether the reporting shall be periodic or threshold-based, also including the period value or threshold value.

iii. An indication of the desired accuracy for each metric. This information helps UPF to adjust the probing and reporting mechanisms.

The above steps take place before the user's session is established. The following steps take place during the PDU session establishment phase.

55. The UE 41 sends a PDU session establishment request message to AMF, and AMF relies it to SMF 9. The message includes the User-ID.

56. The SMF 9 queries the PCF 6 to get the policy rules including the User-ID as parameter.

57. The PCF responds to SMF with the policy rules for that specific user. Each policy rule includes two novel pieces of information (This is a novel part of the invention):

a. Forwarding options, indicating the possible options for the forwarding decisions. They can be:
  i. Multi-access options: if UPF 10 can choose between different accesses (e.g. 5G, 4G, Wi-fi, etc.) to forward the traffic, the set of this possible accesses is included. An optional indication of how UPF can decide to share the traffic among them is also possible, e.g. indicating preferences, or percentage of traffic that is expected trough one or several accesses.
  ii. Data Network options: if UPF 10 can choose to forward traffic to different data networks (e.g. between edge DNs and central DNs), the set of the possible data networks is included. An optional indication of how UPF can decide to forward the traffic among them is also possible, e.g. indicating preferences, or percentage of traffic that is to one data network.

b. Quality range, indicating the degree of freedom for the quality enforcement decisions. I.e. instead of indicating a fixed value for a quality parameter (e.g. maximum bit rate, MBR), indicating the range in which the parameter can vary (e.g. MBR-range-low, MBR-range-high)

58. Based on the information received from PCF 6 the SMF 9 derives the action space, i.e. the discrete set of forwarding- or quality-related actions that the UPF can choose from. The skilled person understands that the precise algorithm the SMF uses for this step is implementation-specific.

59. The SMF 9 sends to UPF 10 a PFCP Session Establishment Request message including:

a. PDR, indicating the packet matching rules b. A set of FARs, each FAR including one of the forwarding-related actions of the action space. Each FAR also includes a flag indicating that it belongs to the action space for the RL agent. This is a novel part of the invention c. A set of QERs, each QER including one of the quality-related actions of the action space. Each QER also includes a flag indicating that it belongs to the action space for the RL agent It may be noted that the message for the update of a session—Session Establishment Modification is equivalent to this step.

60. The UPF 10 sends a PFCP Session Establishment Response message back to SMF.

61. The PDU session establishment procedure is completed. When the PDU session is established and the action space configured in the UPF agent, the UPF can start taking decisions based on the action space.

62. The UE 41 of a certain user starts sending traffic to the network and the traffic traverses the UPF 10 with the RL agent 63. The packets of the traffic match a PDR associated to FARs or QERs belonging to the action space of the UPF agent.

64. (optional step) Since the network state is needed as input for the action decisions, in case the UPF 10 has not received the network state from NWDAF 4 before, the UPF 10 can request the network state to NWDAF 4 including the UPF-ID in the message. This is a novel part of the invention 65. (optional step) In case the previous step has taken place, the NWDAF 4 sends the network state and associated reward to UPF. This is a novel part of the invention 66. The UPF 10 decides what forwarding action to take from the set of FARs belonging to the action space. The skilled person understands that the algorithm the UPF uses to make the decision is implementation-specific.

67. The UPF 10 decides what quality action to take from the set of QERs belonging to the action space. It may be understood by the person skilled in the art that the algorithm the UPF 10 uses to make the decision is implementation-specific. Once an action is taken, the UPF 10 needs feedback from the NWDAF 4 to evaluate the action and learn the optimal actions to apply depending on the network state.

68. The UE 41 of a certain user starts sending traffic to the network and the traffic traverses the UPF 10 with the RL agent 69. The UPF 10 monitors the network conditions and sends to NWDAF a Network State Report message including the UPF-ID and a list of metric-IDs and metric-values (according to the configuration indicated by NWDAF 4 in the UPF Agent Register Response message).

70. NWDAF 4 acknowledges the report

71. Based on the reports NWDAF 4 detects the network state, computes the reward and decides whether to send the Network state update. Note: the algorithm NWDAF 4 uses for this step is implementation-specific.

72. In case NWDAF 4 decides so, it sends a Network state update message to UPF including the network state and associated reward.

73. UPF 10 acknowledges the message

74. The UPF agent takes the new network state and reward and evaluates the actions taken previously. Then it learns how to take improved decisions in the future.

Figure 4:
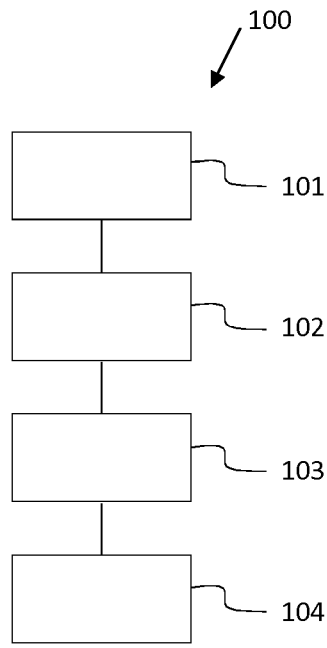
FIG. 4 schematically illustrates a method according to the present disclosure.

FIG. 4 schematically illustrates a method 100 according to the present disclosure.

The method 100 is directed to managing traffic associated with a User Equipment, UE, by a User Plane Function, UPF, in a telecommunication network, said UPF being associated with a Session Management Function, SMF, and a Network Data Analytics Function, NWDAF, wherein said UPF has access to an observation space comprising a list of possible states said network may take and wherein said UPF has access to an action space comprising a list of possible actions that said UPF is allowed to perform.

The method 100 comprising the steps of:
receiving 101, by said UPF, from said NWDAF, a state of said network, wherein said state is comprised by said list of possible states;
receiving 102, by said UPF, from said NWDAF, a reward, wherein said reward indicates a degree of satisfaction of said network to be in said state;
receiving 103, by said UPF, network traffic from said UE;
performing 104, by said UPF, triggered by said received traffic, an action comprised by said list of possible actions based on said received state of said network and based on said received reward.

Figure 5:
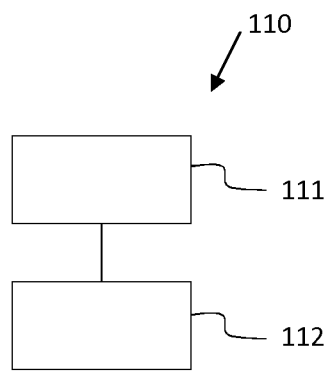
FIG. 5 schematically illustrates a method according to the present disclosure.

FIG. 5 schematically illustrates a method according to the present disclosure.

The method 110 is directed to the supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an observation space comprising a list of possible states said network may take.

The method 110 comprising the steps of:
- receiving 111, by said NWDAF, from said UPF, a UPF Agent Register Request message to register said UPF in said NWDAF;
- transmitting 112, by said NWDAF, to said UPF, a UPF Agent Register Response message acknowledging said registration, wherein said Response message further comprises said observation space.

Figure 6:
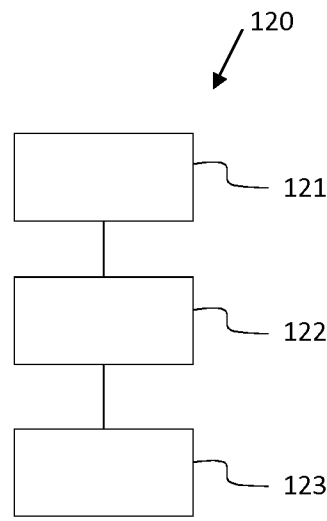
FIG. 6 schematically illustrates a method according to the present disclosure.

FIG. 6 schematically illustrates a method according to the present disclosure.

The method 120 is directed to the supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an action space comprising a list of possible actions said UPF is allowed to perform. The method 120 comprises the steps of:
- receiving 121, by said SMF, a Session Establishment Request message for requesting, by said UE, a session in said telecommunication network;
- determining 122, by said SMF, said action space associated with said UE;
- transmitting 123, by said SMF, said determined action space to said UPF.

Figure 7:
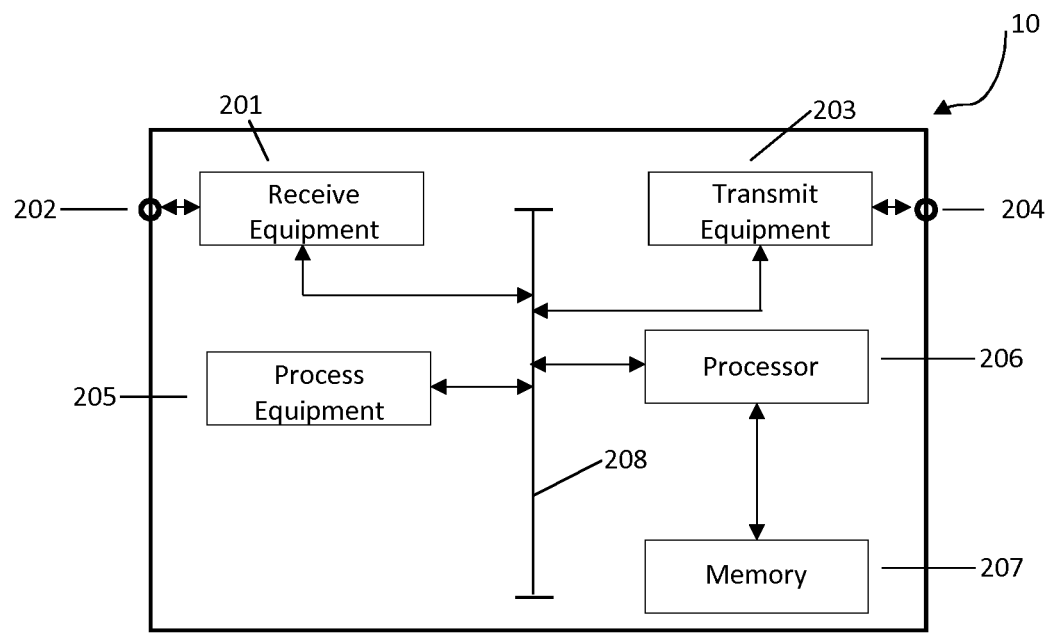
FIG. 7 schematically illustrates a node in a 5G telecommunication network according to the present disclosure.

FIG. 7 schematically illustrates a node in a 5G telecommunication network according to the present disclosure.

The node resembled a User Plane Function, UPF, 10 arranged for managing traffic associated with a User Equipment, UE, in a telecommunication network, said UPF being associated with a Session Management Function, SMF, and a Network Data Analytics Function, NWDAF, wherein said UPF has access to an observation space comprising a list of possible states said network may take and wherein said UPF has access to an action space comprising a list of possible actions that said UPF is allowed to perform, UPF comprising:
- receive equipment 201 arranged for receiving, via the receiving terminal 202, from said NWDAF, a state of said network, wherein said state is comprised by said list of possible states, and for receiving, from said NWDAF, a reward, wherein said reward indicates a degree of satisfaction of said network to be in said state, and for receiving network traffic from said UE;
- process equipment 205 arranged for performing, triggered by said received traffic, an action comprised by said list of possible actions based on said received state of said network and based on said received reward.

The UPF 10 may further comprise transmit equipment 203 for transmitting packets, i.e. message, into the telecommunication network, using the transmitting terminal 204. Further, the UPF 10 may comprise a processor 206, a memory 207 and a bus 108 for connecting the processor 206 with the process equipment 205, the receive equipment 201 and the transmit equipment 203.

Figure 8:
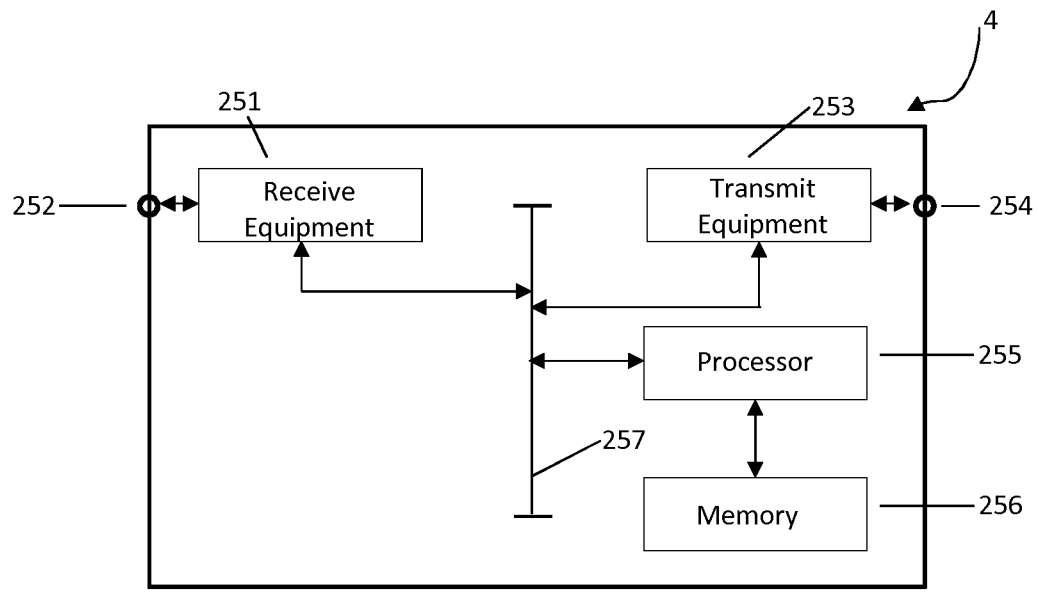
FIG. 8 schematically illustrates a node in a 5G telecommunication network according to the present disclosure.

FIG. 8 schematically illustrates a node in a 5G telecommunication network according to the present disclosure.

More specifically, the node may be a Network Data Analytics Function, NWDAF, 4 arranged for supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an observation space comprising a list of possible states said network may take, said NWDAF comprising:
- receive equipment 251 arranged for receiving, via the receiving terminal 252, from said UPF, a UPF Agent Register Request message to register said UPF in said NWDAF;
- transmit equipment 253 arranged for transmitting, via the transmitting terminal 254 to said UPF, a UPF Agent Register Response message acknowledging said registration, wherein said Response message further comprises said observation space.

The NWDAF 4 may further comprise a processor 255, a memory 256 and a bus 257, which bus 257 connects the processor 255 with the receive equipment 251 and with the transmit equipment 253.

Figure 9:
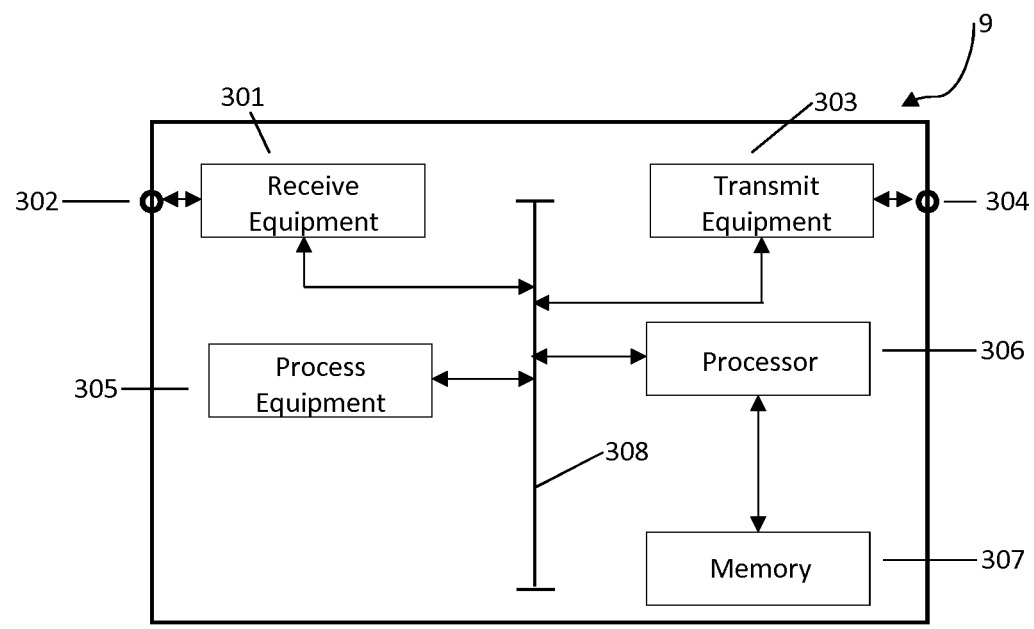
FIG. 9 schematically illustrates a node in a 5G telecommunication network according to the present disclosure.

FIG. 9 schematically illustrates a node in a 5G telecommunication network according to the present disclosure.

More specifically, the node may be a Session Management Function, SMF, 9 arranged for supporting of the managing of traffic associated with a User Equipment, UE, by a User Plane Function, UPF, in a telecommunication network, said UPF being associated with a Session Management Function, SMF, and a Network Data Analytics Function, NWDAF, wherein said UPF is to have access to an action space comprising a list of possible actions said UPF is allowed to perform, wherein said SMF comprises:
- receive equipment 301 arranged for receiving, via a receiving terminal 302, a Session Establishment Request message for requesting, by said UE, a session in said telecommunication network;
- process equipment 305 arranged for determining said action space associated with said UE;
- transmit equipment 303 arranged for transmitting, via transmitting terminal 304, said determined action space to said UPF.

The SMF 9 may further comprise a processor 306 and a memory 307, which processor 306 is connected to the process equipment 305, the receive equipment 301 and the transmit equipment 303 via the bus 308.

Other variations to the disclosed examples can be understood and effected by those skilled in the art of practicing the claimed disclosure, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the examples as disclosed above, can be modified and enhanced by those skilled in the art beyond the scope of the present disclosure as disclosed in the appended claims without having to apply inventive skills.

The invention claimed is:

1. A method of managing traffic associated with a User Equipment (UE) by a User Plane Function (UPF) in a telecommunication network, the UPF associated with a Session Management Function (SMF) and a Network Data Analytics Function (NWDAF), wherein the UPF has access to an observation space comprising a list of possible states the network may take, wherein the UPF has access to an action space comprising a list of possible actions that the UPF is allowed to perform, the method comprising the UPF:
   receiving, from the NWDAF, a state of the network; wherein the state is comprised by the list of possible states;
   receiving, from the NWDAF, a reward; wherein the reward indicates a degree of satisfaction of the network to be in the state;
   receiving network traffic from the UE; and
   performing, in response to receiving the network traffic from the UE, an action comprised by the list of possible actions based on the received state of the network and based on the received reward.

2. The method of claim 1, further comprising the UPF:
   transmitting, to the NWDAF, a UPF Agent Register Request message to register the UPF in the NWDAF; and
   receiving, from the NWDAF, a UPF Agent Register Response message acknowledging registration, wherein the UPF Agent Register Response message comprises the observation space.

3. The method of claim 1, further comprising the UPF:
   receiving, from the SMF, a Session Establishment Request message, wherein the Session Establishment Request message comprises the list of possible actions; wherein the list of possible actions comprises:
      one or more Forwarding Action Rules for indicating forwarding related actions for traffic received from the UE; and/or
      one or more Quality of Service Enforcement Rules for indicating quality related actions for traffic received from the UE; and
   transmitting, to the SMF, a Session Establishment Response message for acknowledging the Session Establishment Request message.

4. The method of claim 1, further comprising the UPF:
   transmitting, to the NWDAF, a Network State Report message for requesting the state of the network as well as for a corresponding reward; and
   receiving, from the NWDAF, the state of the network as well as the corresponding reward.

5. The method of claim 1, wherein the performing the action comprises the UPF determining which action to perform using a reinforcement learning algorithm taking into account previously performed actions by the UPF associated with previously observed states of the network as well as corresponding rewards.

6. A method of supporting the managing of traffic associated with a User Equipment (UE) by a User Plane Function (UPF) in a telecommunication network, the UPF associated with a Session Management Function (SMF) and a Network Data Analytics Function (NWDAF), wherein the UPF is to have access to an observation space comprising a list of possible states the network may take, the method comprising the NWDAF:
   receiving, from the UPF, a UPF Agent Register Request message to register the UPF in the NWDAF;
   transmitting, to the UPF, a UPF Agent Register Response message acknowledging the registration, wherein the UPF Agent Register Response message comprises the observation space;
   determining a state of the network, wherein the state of the network is comprised by the list of possible states;
   determining a reward, wherein the reward indicates a degree of satisfaction of the network to be in the state; and
   transmitting, to the UPF, the determined state of the network and the reward.

7. The method of claim 6, wherein the determining the reward comprises determining the reward based on an overall network load status and/or a Quality of Experience of the UE.

8. A User Plane Function (UPF) configured to manage traffic associated with a User Equipment (UE) in a telecommunication network, the UPF associated with a Session Management Function (SMF) and a Network Data Analytics Function (NWDAF), wherein the UPF has access to an observation space comprising a list of possible states the network may take, wherein the UPF has access to an action space comprising a list of possible actions that the UPF is allowed to perform, the UPF comprising:
   receive circuitry configured to receive:
      a state of the network from the NWDAF, wherein the state is comprised by the list of possible states;
      a reward from the NWDAF, wherein the reward indicates a degree of satisfaction of the network to be in the state; and
      network traffic from the UE; and
   processing circuitry configured to perform, in response to receiving the network traffic from the UE, an action comprised by the list of possible actions based on the received state of the network and based on the received reward.

9. The UPF of claim 8, wherein the UPF is configured to:
   transmit, to the NWDAF, a UPF Agent Register Request message to register the UPF in the NWDAF; and
   receive, via the receive circuitry and from the NWDAF, a UPF Agent Register Response message acknowledging registration, wherein the UPF Agent Register Response message comprises the observation space.

10. The UPF of claim 8, wherein the UPF is configured to:
    receive, via the receive circuitry and from the SMF, a Session Establishment Request message, wherein the Session Establishment Request message comprises the list of possible actions, wherein the list of possible actions comprises:
       one or more Forwarding Action Rules for indicating forwarding related actions for traffic received from the UE; and/or
       one or more Quality of Service Enforcement Rules for indicating quality related actions for traffic received from the UE; and
    transmit, to the SMF, a Session Establishment Response message for acknowledging the Session Establishment Request message.

11. The UPF of claim 8, wherein the UPF is configured to:
    transmit, to the NWDAF, a Network State Report message for requesting the state of the network as well as for a corresponding reward; and
    receive, via the receive circuitry and from the NWDAF, the state of the network as well as the corresponding reward.

12. The UPF of claim 8, wherein the performing the action comprises the UPF determining which action to perform using a reinforcement learning algorithm taking into account previously performed actions by the UPF associated with previously observed states of the network as well as corresponding rewards.

13. A Network Data Analytics Function (NWDAF) configured to support managing of traffic associated with a User Equipment (UE) by a User Plane Function (UPF) in a telecommunication network, the UPF associated with a Session Management Function (SMF) and the Network Data Analytics Function (NWDAF), wherein the UPF is to have access to an observation space comprising a list of possible states the network may take, the NWDAF comprising:

receive circuitry configured to receive, from the UPF, a UPF Agent Register Request message to register the UPF in the NWDAF;

transmit circuitry configured to transmit, to the UPF, a UPF Agent Register Response message acknowledging the registration, wherein the UPF Agent Register Response message comprises the observation space;

wherein the NWDAF is configured to:
  determine a state of the network, wherein the state of the network is comprised by the list of possible states;
  determine a reward, wherein the reward indicates a degree of satisfaction of the network to be in the state; and
  transmit, to the UPF, the determined state of the network and the reward.

14. The NWDAF of claim 13, wherein the determining the reward comprises determining the reward based on an overall network load status and/or a Quality of Experience of the UE.

* * * * *

UNITED STATES PATENT AND TRADEMARK OFFICE
CERTIFICATE OF CORRECTION

PATENT NO. : 11,910,228 B2
APPLICATION NO. : 17/269613
DATED : February 20, 2024
INVENTOR(S) : Puente Pestaña et al.

It is certified that error appears in the above-identified patent and that said Letters Patent is hereby corrected as shown below:

In the Specification

In Column 1, Line 41, delete "packet" and insert -- packet; --, therefor.

In Column 2, Line 14, delete "relies" and insert -- relays --, therefor.

In Column 3, Line 24, delete "advantageous" and insert -- advantages --, therefor.

In Column 3, Line 32, delete "an based" and insert -- and based --, therefor.

In Column 3, Line 53, delete "uses a" and insert -- uses as a --, therefor.

In Column 3, Line 57, delete "may provided" and insert -- may be provided --, therefor.

In Column 3, Line 59, delete "etc.)" and insert -- etc.). --, therefor.

In Column 3, Line 65, delete "mechanisms" and insert -- mechanisms. --, therefor.

In Column 4, Line 63, delete "take" and insert -- take. --, therefor.

In Column 5, Line 16, delete "such" and insert -- such. --, therefor.

In Column 5, Line 38, delete "perform" and insert -- perform. --, therefor.

In Column 8, Line 24, delete "environment" and insert -- environmental --, therefor.

In Column 8, Line 49, delete "response the" and insert -- response includes the --, therefor.

In Column 8, Line 59, delete "uses a" and insert -- uses as a --, therefor.

Signed and Sealed this
Fourth Day of June, 2024

*Katherine Kelly Vidal*
Katherine Kelly Vidal
*Director of the United States Patent and Trademark Office*

CERTIFICATE OF CORRECTION (continued)
U.S. Pat. No. 11,910,228 B2

In Column 8, Line 67, delete "etc.)" and insert -- etc.). --, therefor.

In Column 9, Line 23, delete "this" and insert -- the --, therefor.

In Column 9, Line 27, delete "trough" and insert -- through --, therefor.

In Column 9, Line 39, delete "MBR-range-high)" and insert -- MBR-range-high). --, therefor.

In Column 9, Line 48, delete "rules" and insert -- rules. --, therefor.

In Column 9, Line 52, delete "invention" and insert -- invention. --, therefor.

In Column 9, Line 63, delete "taking" and insert -- making --, therefor.

In Column 9, Line 67, delete "agent" and insert -- agent. --, therefor.

In Column 10, Line 8, delete "invention" and insert -- invention. --, therefor.

In Column 10, Line 11, delete "invention" and insert -- invention. --, therefor.

In Column 10, Line 25, delete "agent" and insert -- agent. --, therefor.

In Column 10, Line 31, delete "report" and insert -- report. --, therefor.

In Column 10, Line 39, delete "message" and insert -- message. --, therefor.

In Column 10, Line 42, delete "take" and insert -- make --, therefor.